Sept. 15, 1964  G. BRÜCKNER  3,148,409
MATERIAL TREATING MACHINE
Filed March 20, 1962  9 Sheets-Sheet 1
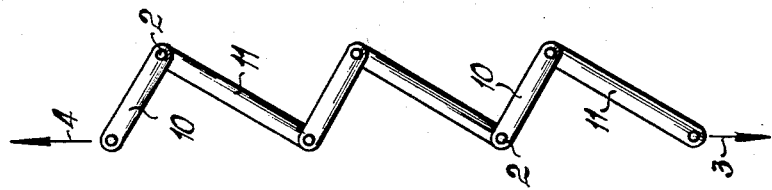
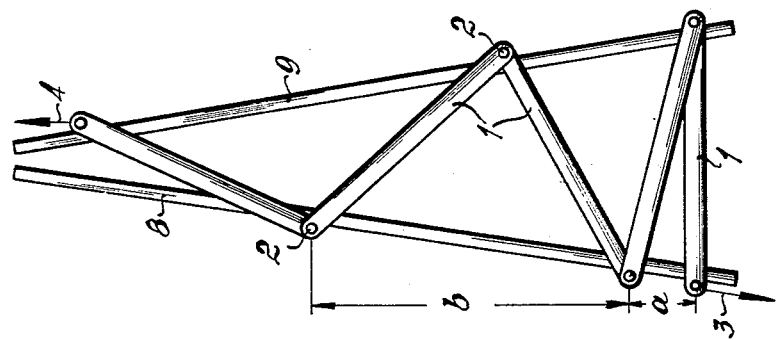
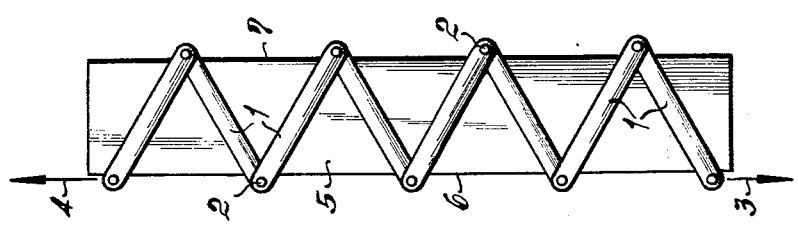
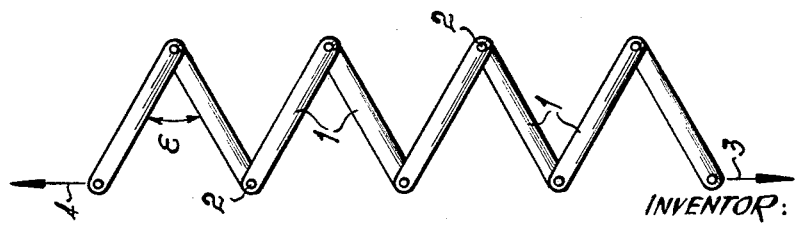
INVENTOR:
Gernot Brückner
By: George K Spencer
Attorney Sept. 15, 1964  G. BRÜCKNER  3,148,409
MATERIAL TREATING MACHINE
Filed March 20, 1962  9 Sheets-Sheet 2
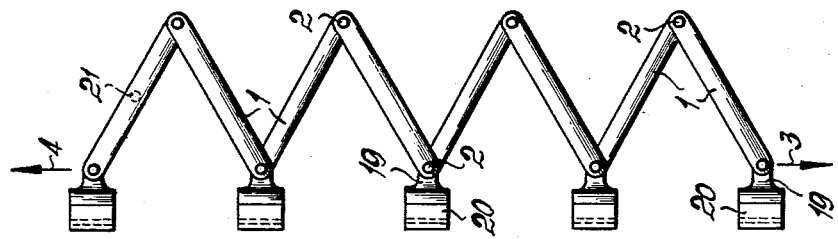
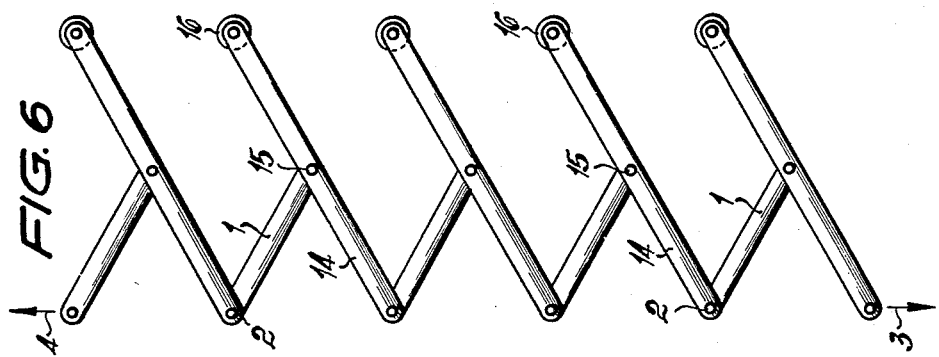
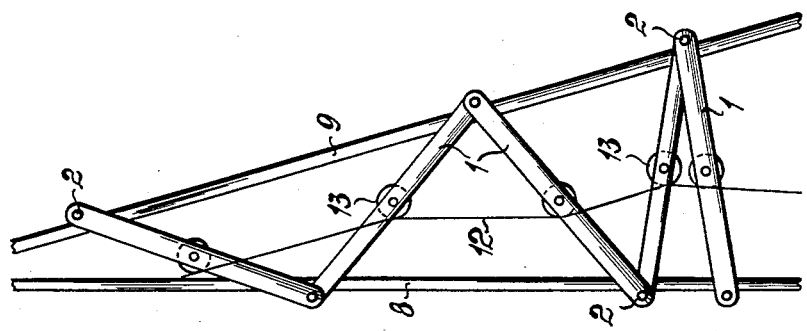
INVENTOR:
Gernot Brückner
By: George B Spencer
Attorney

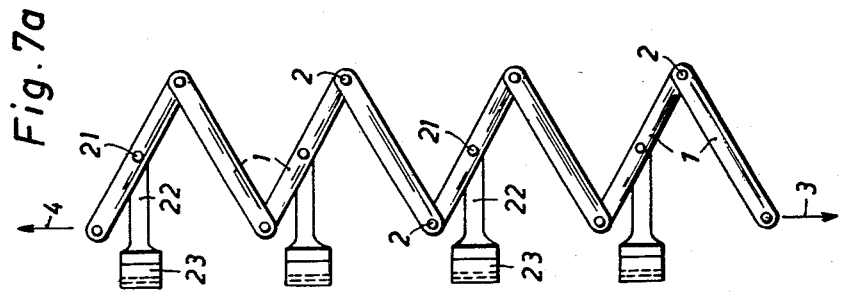
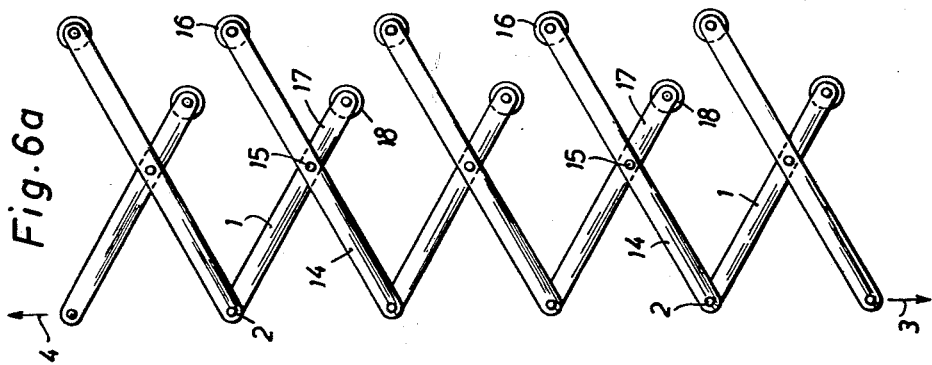

Sept. 15, 1964   G. BRÜCKNER   3,148,409
MATERIAL TREATING MACHINE
Filed March 20, 1962   9 Sheets-Sheet 4

INVENTOR:
Gernot Brückner
By: George H. Spencer
Attorney

Sept. 15, 1964 G. BRÜCKNER 3,148,409
MATERIAL TREATING MACHINE
Filed March 20, 1962 9 Sheets-Sheet 5

INVENTOR:
Gernot Brückner
By: George H. Spencer
Attorney

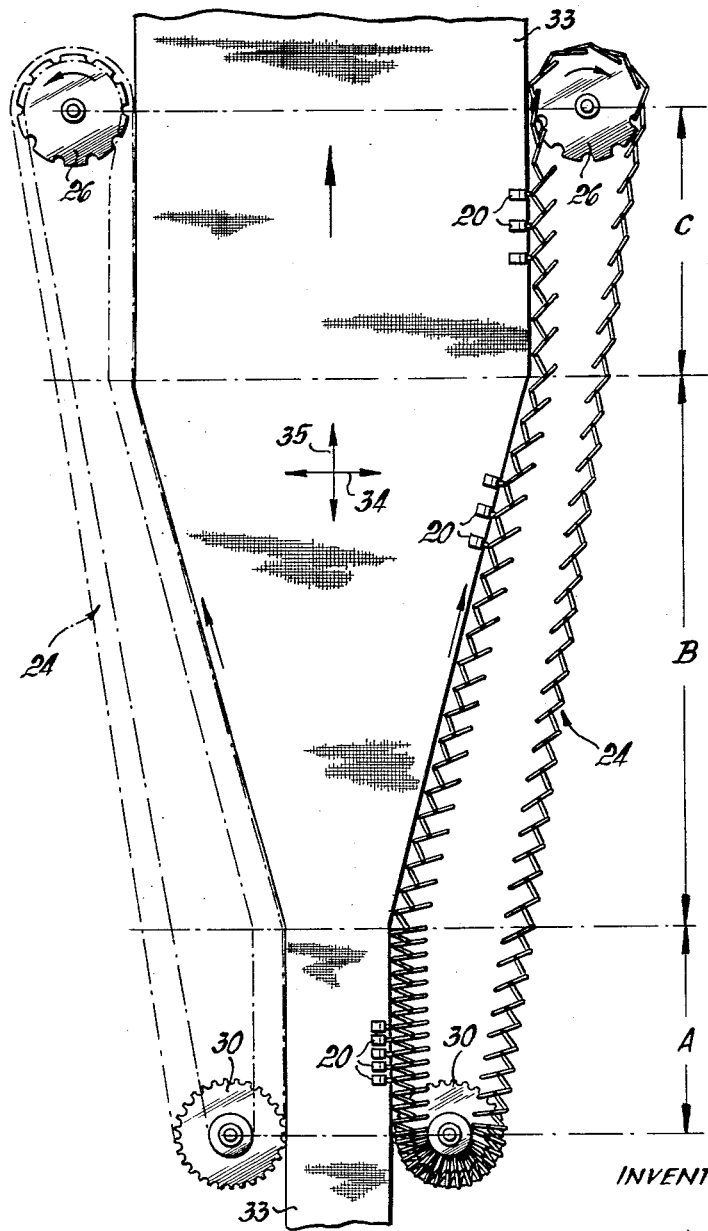

Sept. 15, 1964     G. BRÜCKNER     3,148,409
MATERIAL TREATING MACHINE
Filed March 20, 1962     9 Sheets—Sheet 7

INVENTOR:
Gernot Brückner
By: George H. Spencer
Attorney

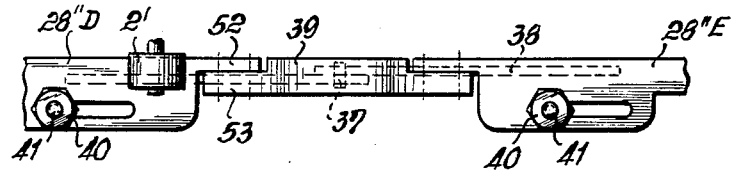
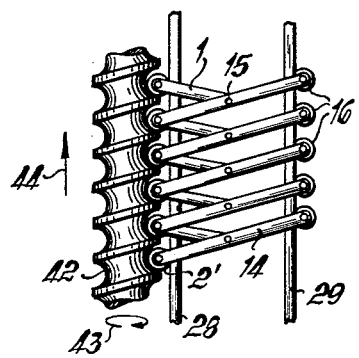
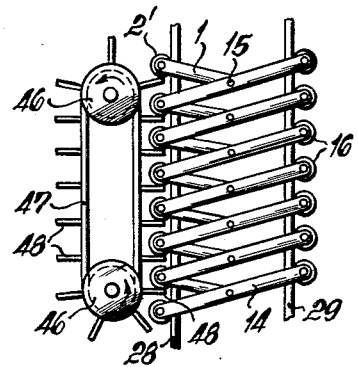
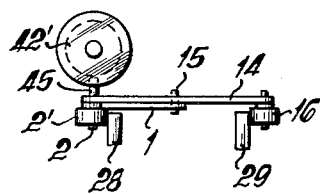
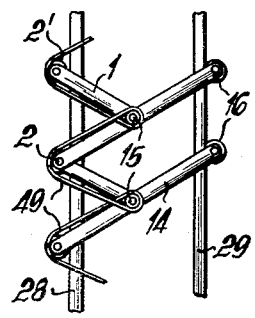

Sept. 15, 1964          G. BRÜCKNER          3,148,409
MATERIAL TREATING MACHINE Filed March 20, 1962          9 Sheets-Sheet 9

INVENTOR:

Gernot Brückner

By: George H. Spencer
Attorney

United States Patent Office

3,148,409
Patented Sept. 15, 1964

---

3,148,409
MATERIAL TREATING MACHINE
Gernot Brückner, Leonberg, Wurttemberg, Germany, assignor to Trockentechnik Kurt Bruckner KG, Leonberg, Wurttemberg, Germany
Filed Mar. 20, 1962, Ser. No. 181,053
Claims priority, application Germany, Mar. 21, 1961, T 19,828
10 Claims. (Cl. 18—1)

The present invention relates to a material treating machine.

More particularly, the present invention relates to a machine equipped with chains carrying holding devices, such as chucks, for stretching webs, such as plastic webs, in transverse and longitudinal directions simultaneously.

There exist various machines for continuously stretching stretchable plasitc webs or foils in longitudinal and transverse directions simultaneously. Such machines comprise lateral holding devices or chucks arranged in appropriate guides such that, as the chucks are advanced, the distance between them, in both longitudinal and transverse directions, increases. This is done by providing a series of spindles which, from the beginning of the stretching zone to the end, are of continuously increasing pitch. Other types of stretching machines include chains which carry the chucks for holding the web, the chains being composed of pivotally connected links which may be folded toward each other to form a zigzag arrangement, somewhat in the manner of a folding rule. These links are provided with guide rollers which run along groove-shaped tracks which encompass both sides of the rollers.

The present invention relates to an improvement over the above type of arrangement, in that it resides in a machine wherein each of two chains arranged at the sides of the web is composed of pivotally connected links which may be folded toward each other in zigzag arrangement, and wherein these links are provided with the chucks for holding the web as well as with engaging elements, such as rollers, which engage but one side of guide surfaces that are suitably positioned so as to define the limits of the stretching.

More particularly, the engaging elements are arranged in two rows each of which extends in the direction of the length of the chain. The chain is guided by guide means forming two guide surfaces which extend in the direction in which the chain is to travel, with the engaging elements of one of the rows engaging only one of the surfaces and the engaging elements of the other of the rows engaging only the other of the two surfaces. The complete machine will include two such chains and guide means therefor, the two chains being arranged on opposite sides of the web. The web is thus held by the chucks on the two chains, the over-all arrangement, which will be described more fully below, being such that the distance between the chucks of the same chain and/or the distance between the chucks of the two chains is increased in a desired manner, so as to produce the desired longitudinal and/or transverse stretching effect on the web.

In the arrangement according to the present invention, the extent to which the material is stretched both longitudinally and transversely, may easily be made infinitely adjustable simply by providing means for varying the angle between the guide tracks. This has a very substantial advantage over the above-mentioned spindle-type machines in which one set of spindles has to be exchanged for a set of different spindles so as to obtain a different degree of stretching in longitudinal direction. Furthermore, the cost of making spindles is very high as compared to the simplicity with which links used in the arrangement according to the present invention may be manufactured. Additionally, the instant invention avoids the inherent difficulties encountered in threading the chucks onto the spindles.

The present invention also offers advantages over the above-described machine incorporating pivoted link-type chains wherein the guide rollers which run in grooved tracks are encompassed on both sides in that there is substantially less friction. Moreover, the arrangement according to the prior art has a tendency to jam, and this is avoided by the present invention.

According to another feature of the present invention, the links of the chain are extended beyond their points of intersection, and the extensions carry the engaging elements which abut appropriate guides that limit the stretchability of the chain. The distance from the guide acting on the opposite side can thus be easily increased, thereby reducing the jamming tendency of the chain.

According to another feature of the present invention, the chains and guide means therefor, arranged on both sides of the web, are positioned so as to lie not in a horizontal plane but in a plane forming an acute, or even right, angle with the horizontal. As a result, at least a component of the force of gravity acts in the direction in which the web extends, thereby reducing friction losses.

Additional objects and advantages of the present invention will become apparent upon consideration of the following description when taken in conjunction with the accompanying drawings in which:

FIGURE 1 is a schematic showing of a link chain of the type to which the present invention pertains.

FIGURE 2 shows the chain of FIGURE 1 in conjunction with guide means having two opposite guide surfaces.

FIGURE 3 is similar to FIGURE 2, but shows the guide means as being inclined relative to each other.

FIGURE 4 is a schematic diagram of a chain incorporating links of different lengths.

FIGURE 5 shows how the chain can be used in conjunction with more than two guide surfaces.

FIGURE 6 shows a chain having alternate links extending beyond their intersection with other links.

FIGURE 6a shows a chain in which each link extends beyond its intersection with the other links.

FIGURE 7 shows a chain carrying chucks at the joints of consecutive links.

FIGURE 7a shows a chain whose links carry chucks at a point intermediate the pivotal connections.

FIGURE 13 shows how the arrangement of FIGURE 12 can be used to effect different stretching in different sections.

FIGURE 19 shows a pivot joint between two sections of the rail of FIGURE 18 which allows these sections to form an angle with each other.

FIGURE 20 shows one embodiment of an auxiliary device for conveying the chain while it is in its least extended position.

FIGURE 21 shows another embodiment of an auxiliary device for conveying the chain while it is in its least extended position.

FIGURE 22 shows yet another embodiment of an auxiliary device for conveying the chain while it is in its least extended position.

FIGURE 23 shows how the links of the chain may be spring-connected to each other.

Figure 8:
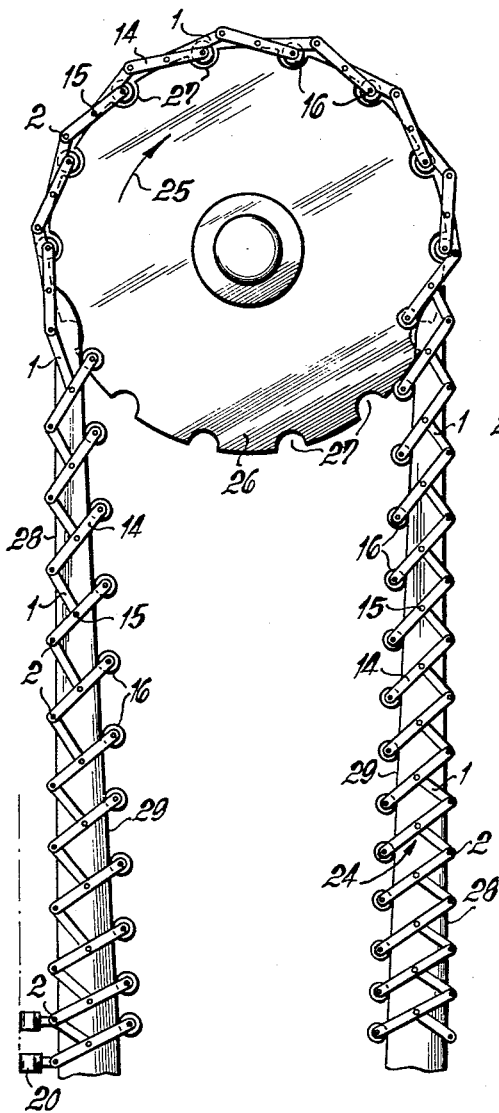
FIGURE 8 shows how the chain is fed over a wheel arranged there where the chain is in its most extended position.

Referring now to drawings, FIGURE 1 shows a linkage chain composed of equally long links 1 which are pivotally connected to each other, in the manner of a folding rule, by joints 2. In the illustrated position, the links form an angle $\epsilon$ between each other. If forces, indicated by arrows 3 and 4, are applied at the ends of the chain, the chain is lengthened and each of the angles $\epsilon$ will continually increase until they all reach 180°. Suitable provision can be made so that, upon the application of forces 3 and 4, the angles between the various links will remain equal to each other, or that the angles will vary, throughout the length of the chain, in a predetermined given manner. Guide rollers are arranged at the joints 2, which guide rollers run in appropriate grooved tracks (not shown in FIGURE 1).

FIGURE 2 shows the chain of FIGURE 1, equipped with guide rollers or other types of suitable engaging elements at the joints 2, and straddling a guide means in the form of a body 5 whose left side, as viewed in FIGURE 2, has a guide surface 6 and whose right side has a guide surface 7. The rollers are arranged in rows, the rollers of one row running on the surface 6 and the rollers of the other row running on the surface 7. It will be seen that, if the forces are applied as shown by arrows 3 and 4, the joints will not be able to move toward each other so that the positions of the links 1 relative to each other cannot change. Thus, the angles between adjacent links and the distances which the joints 2 are spaced apart will remain constant. It is, of course, obvious that the guide surface 6 and 7 need not be the surfaces of a single body 5, but that separate guide elements may be provided.

FIGURE 3 shows the two rows of rollers at joints 2 guided along two separate guide surfaces 8 and 9 which are arranged at an angle to each other. There, where the surfaces 8 and 9 are furthest apart, the links 1 form the smallest angle with each other; conversely, there, where these surfaces are closest together, the angle will be the greatest. Thus, the links are stretched the furthest where the surfaces are closest together. Similarly, the distance between the joints 2, and the rollers carried thereat, is small where the surfaces are furthest apart, as shown at $a$, and larger where the surfaces are less wide apart, as shown at $b$.

FIGURE 4 shows a chain in which the links are composed of pairs 10, 11, of different lengths. The guide surfaces, such as surfaces 6 and 7 of FIGURE 2, and 8 and 9 of FIGURE 3, can then be spaced apart a distance no greater than the shortest link of the chain; if the arrangement involves surfaces which are at an angle to each other, the surfaces cannot be spaced further from each other, at any point, than the length of the shorter links 10.

FIGURE 5 shows a chain similar to that of FIGURES 1 through 3, there being, however, in addition to the surfaces 8 and 9 of FIGURE 3, a middle guide surface 12, which cooperates with guide rollers 13 carried by the links 1. These rollers 13 may engage one side or the other of the guide surface 12. It will be seen, therefore, that it is not essential that the guide rollers be arranged only at the joints 2, since additional rollers, or rollers which take the place of rollers arranged at the joints, may be provided at other points on the chain and still produce the same effect as the rollers located at the joints.

In the arrangement shown in FIGURE 6, only one of the links of each pair is constructed in the manner described so far. The other link 14 is extended beyond its joint 15 with the link 1. The free ends of links 14 also carry guide rollers 16. In this arrangement, it is not essential that the chain carry guide rollers at the joints 15, it being sufficient to provide guide rollers at the joints 2 and at the free ends of the links 14, so that, when the chain is sought to be stretched by the application of forces at 3 and 4, the chain will engage guide surfaces only at the points 2 and 16. As stated above, the purpose of so extending the links beyond their intersection is that, in this way, the distance between the guide surfaces for the chain is increased, thereby reducing the tendency of the chain to jam.

FIGURE 6a shows that the links 1 may be provided with extensions 17 going beyond the joints 15, which extensions carry, at their free ends, additional guide rollers 18 which cooperate with an appropriately positioned guide surface (not shown). If, however, the extensions 17 were to reach the links 14, and if the juncture of these extensions with the links 14 (occurring at 16, as shown) were to constitute a pivotal connection, the result would be a "lazy tongs" linkage whose quadrangles could be changed only in unison. This arrangement is not desirable, if the chain is to be such as to allow the individual links to be displaced by different amounts.

FIGURE 7 shows how holding devices, or chucks 20, may be mounted on the chain by means of connecting elements 19. The elements 19 may be attached to the joints 2, as stated above, or, as shown in FIGURE 7a, the chucks 23 may be connected to the chain by means of elements 22 attached to an intermediate point 21 on the links.

FIGURE 8 shows how a link chain, constructed substantially as shown in FIGURE 6 and indicated generally at 24, can be driven. As in the arrangement of FIGURE 7, the chucks are attached at the joints of the links. The chain is run over a drive wheel 26 which is rotated in the direction of arrow 25 and is provided, at its periphery, with transverse grooves 27 within which the rollers 16 may be received as soon as the links pertaining to the joints engage the wheel 26. The wheel 26 is arranged at that end of the chain at which the mutually inclined surfaces 28 and 29 guiding each reach of the chain are closest to each other. As the chain leaves the surfaces 28, 29, it will already be in its almost fully stretched position; the wheel 26 will complete the stretching to the maximum possible extensibility of the chain. FIGURE 8 shows how the extensions of the links 14 will lie flat against the periphery of the wheel.

Figure 9:
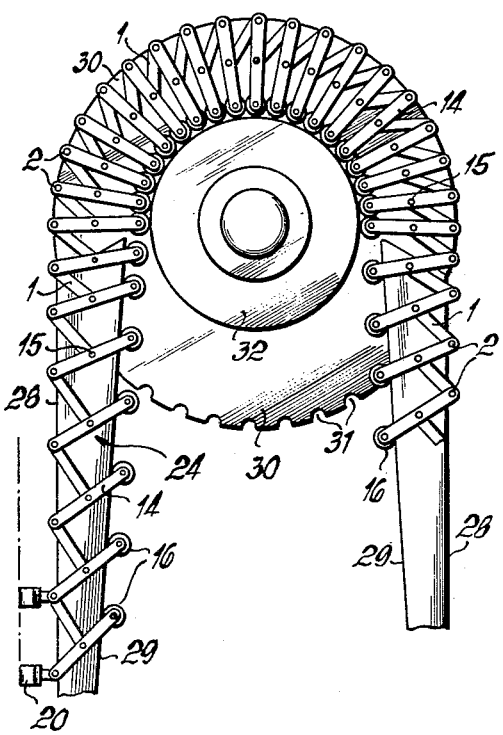
FIGURE 9 shows how the chain is fed over a wheel arranged there where the chain is in its least extended position.

It is also possible to drive, or change the direction of travel of the chain while the same is in its most compressed condition, as shown in FIGURE 9. The wheel 30 about which the closely adjacent links are passed, is provided with transverse grooves 31 for receiving the joints 2, while the rollers 16 will pass over a guide cylinder 32 arranged concentrically with the wheel 30.

It will suffice if the chain is driven at but one end. It will then not matter whether the wheel at the other end is rotated at the same rotational speed as the driving wheel or at a different rotational speed. In both cases, the chain can be driven at both ends.

Figure 10:
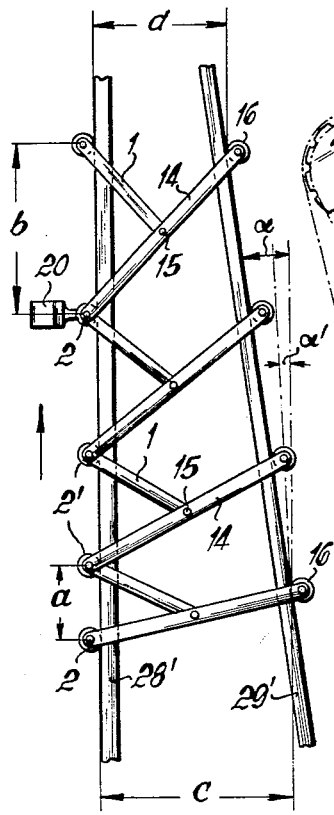
FIGURE 10 shows the chain of FIGURE 6, guided along two rails.
Figure 11:
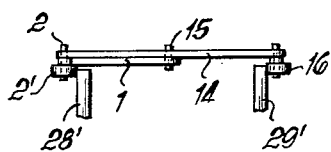
FIGURE 11 is a side elevational view of the structure of FIGURE 10.

In FIGURES 10 and 11, the guide rollers at joints 2 are indicated by 2', and the guide rails 28' and 29' provide the guide surfaces 28 and 29, respectively, described in connection with FIGURE 8. When the distance between the rails changes from c to d, the distance between the guide rollers 2', and therefore the distance between the chucks arranged at the corresponding joints, changes from a to b. The angle between the rails 28' and 29' is adjustable. By changing this angle, for example from α to α', the stretching in longitudinal direction can be adjusted; this will also change the ratio of longitudinal to transverse stretching. If the position of the rails 28' and 29' is adjusted to be such that these rails are parallel, there will be no stretching in longitudinal direction.

Figure 12:
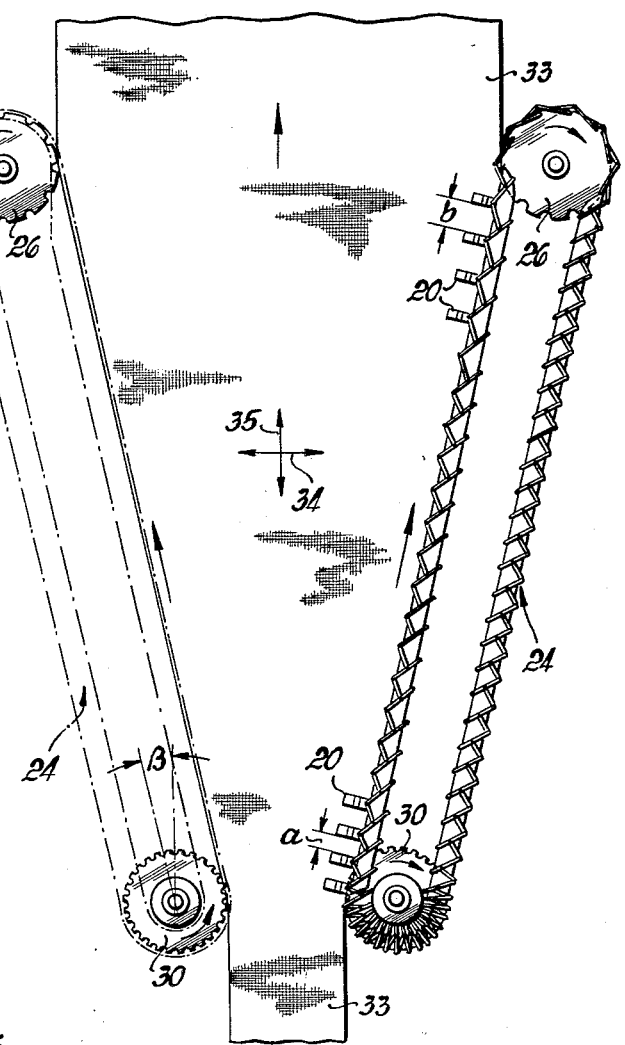
FIGURE 12 shows how two chains according to FIGURE 8 are used in conjunction with each other to stretch a web.

Transverse stretching is obtained by letting the chains 24 arranged at the two sides of the web 33, as shown in FIGURE 12, run at an angle β with respect to the direction in which the web travels. Adjustment of this transverse stretching is attained by making the angle β adjustable. The machine of FIGURE 12 is so set up that the web is stretched both transversely and longitudinally, as shown by the two double arrows 34 and 35, respectively. Of course, the longitudinal stretching and the transverse stretching can be adjusted individually and independently of each other, simply by varying only the angle α or only the angle β, as the case may be.

It is not essential that the stretching be carried out throughout the entire length of the chain. As shown in FIGURE 13, the web is first carried a distance covering the section A without being stretched either longitudinally or transversely. This may be desirable where the web being treated is a plastic foil which, prior to being stretched, should be subjected to a heat treatment. As the web then travels through section B, it is stretched both transversely and longitudinally, as again shown by the double arrows 34 and 35, respectively. Finally, the web travels through section C, where it is once again subjected to neither longitudinal nor transverse stretching; in the case of a plastic foil web, this reach may be used to allow the web to cool. Moreover, the run through section C allows structural changes to occur which will stabilize the web in its new dimensions.

Figure 14:
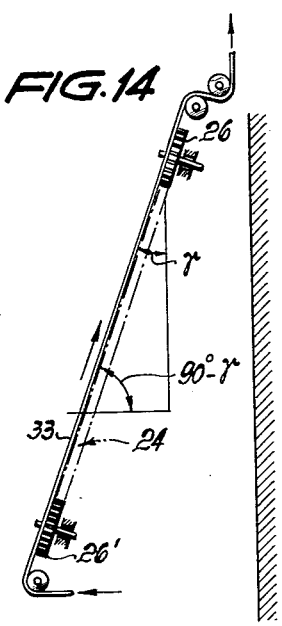
FIGURE 14 shows a non-horizontal arrangement of the chain and guide means.

In the arrangement of FIGURES 12 and 13, it is assumed that the chains and rails arranged on opposite sides of the web are located in a horizontal plane. FIGURE 14 is an elevational view which shows that the web, together with the laterally arranged chains and rails, is located in a plane forming an angle γ with a vertical plane and an angle 90° −γ with the horizontal plane. The limit condition, of course, is that the plane containing the web, chains, and rails is a vertical plane. As stated above, the non-horizontal arrangement insures that at least a component of the force of gravity acts in the direction in which the web extends, thereby reducing friction losses, i.e., in contradistinction to the arrangements wherein the chains are horizontal, the full weight of the chains will no longer act in a direction at right angles to the chains, so that the steeper the suspension of the chains, the smaller will be the friction loss between the chains and the support.

The arrangement according to the present invention may also be used where the stretching operation is to be carried on while the web is immersed in a liquid, such as water, or when the web is to be exposed, during the stretching, to the action of hot liquids or vapors, as is known per se.

Figure 15:
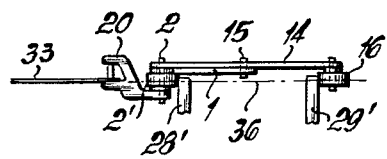
FIGURE 15 is a side elevational view of the chain shown in FIGURE 10 to which the material holding elements are attached in a different way.

In order to avoid subjecting the structure to tipping stresses, the chucks 20 are so arranged as to maintain the web 33, as shown in FIGURE 15, in a plane 36 which bisects the guide rollers 2' and 16'.

Figure 16:
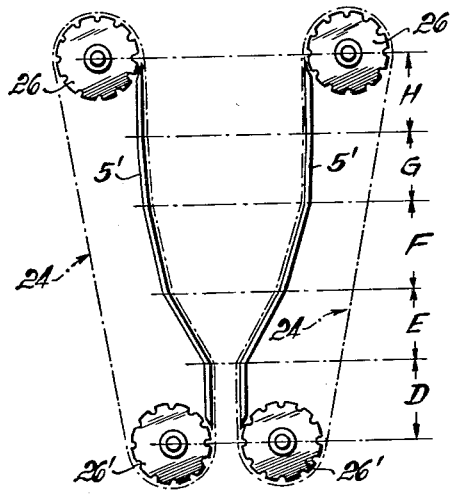
FIGURE 16 shows the machine set up to effect different transverse stretching in different sections.

In the embodiment of FIGURE 16, the distances between the two guide means 5' arranged at the two sides of the web change in different ways. As a result, the degree of lateral stretching to which the web is subjected is changed. In the illustrated embodiment, each of the sections D through H has the guide means 5' arranged symmetrically with respect to the web; if the guide means are constituted by rails 28' and 29', as described in connection with FIGURE 10, these rails will be bent accordingly. It is expedient to let the distance between opposite rail sections be adjustable; if rails are used, the angles which the rails pertaining to the same section form with each other are likewise adjustable. As shown, the web is not stretched transversely in sections D and H adjacent the wheels 26', 26, respectively; however, the web is stretched transversely in sections E, F, and G, the greatest stretching occurring in section E and less in succeeding sections F and G.

Figure 17:
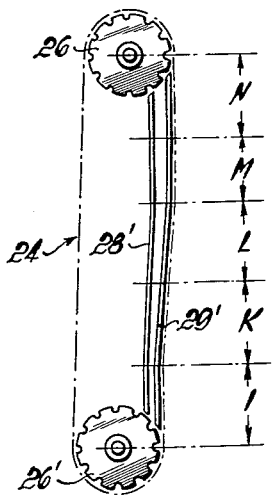
FIGURE 17 shows how one chain of the machine is set up to effect different longitudinal stretching in different sections.

In the arrangement of FIGURE 17, the extent to which the web is stretched in longitudinal direction varies as it travels through sections I, K, L, M, and N, by letting the rails 28', 29', guiding opposite reaches of the chain be inclined differently to each other within these sections. As a result, the chain is spread apart differently within the different sections. Actually, the web is not stretched longitudinaly in sections I and N within which the rails 28' and 29' extend parallel to each other, but such longitudinal stretching does occur in sections K, L, and M, the greatest amount occurring in section L in which the angle between the rails is larger than is the case in sections M and K.

The features of FIGURES 16 and 17 can, of course, be combined with each other so as to obtain sectionalized longitudinal and transverse stretching. This is important because different materials will have to be subjected to different treatments. For instance, some foils have to be stretched quickly at first, and then more slowly, whereas other materials should first be stretched slowly and then more quickly.

Figure 18:
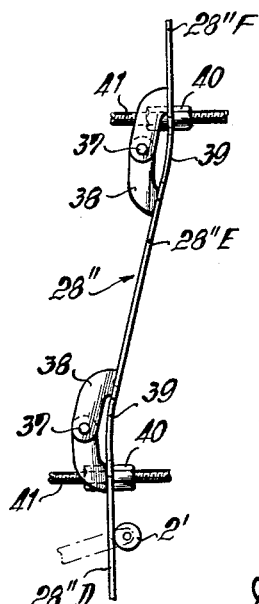
FIGURE 18 shows sections of a guide means which are independently adjustable.

FIGURES 18 and 19 show a rail 28" which is divided into sections 28"D, 28"E, and 28"F. The facing ends of sections 28"D and 28"E, and of sections 28"E and 28"F are connected to each other by means of connecting elements 38 which are pivotally connected with pins 37 whose axes extend at right angles to the plane of the web, and by yieldable elements 39 made, for instance, of spring steel. The junctures of rails and yieldable elements are formed by extensions 52 of the rails which overlap similar extensions 53 of the yieldable elements. These elements 39 thus serve as a bridge, for the guide rollers carried by the chain, from one rail to the next. The length of the juncture is longitudinally adjustable at at least one end, for example, by means of retaining screws arranged in longitudinal slots, so that the length of the juncture between the rails can be adjusted, depending on the angular position of the rails involved.

FIGURE 18 also shows how the angular position of the individual rails may be adjusted. This is accomplished by means of threaded sleeves carried by the rails, through which sleeves pass axially immovable spindles 41, so that, upon rotation of the spindles, the sleeves, and with them the corresponding end of the rail, will be moved in the direction of the spindle axis.

Instead of providing a plurality of rigid rails joined together by yieldable bridges, such as the elements 39 described above, the entire rail may consist of a single yieldable member, made, for example, of spring steel.

Also, the arrangement may be such that the guide surfaces, instead of being rectilinear, have portions forming a curve of constant curvature.

Experience has shown that some difficulties are encountered in transporting a chain of the type involved, while such chain is under stress, in the region where the chain is least extended (see section A in FIGURE 13). FIGURES 20, 21, and 22 show three embodiments of auxiliary devices according to the present invention which are especially adapted for conveying the chain in its most folded position.

FIGURE 20 shows an embodiment incorporating a rotatable but axially immovable worm 42 arranged next to the chain. The thread of the worm 42 engages the guide rollers so that when the worm is rotated in the direction of arrow 43, the chain is advanced in the direction of arrow 44. Alternatively, the worm 42 may be arranged above or below the chain.

FIGURE 21 shows an embodiment in which the worm 42' is arranged above the joints 2 of the chain. The chain is provided with guide pins 45 connected to the joints, which pins 45 engage the threads of the worm 42'

In the embodiment of FIGURE 22, the worm is replaced by an auxiliary chain or belt 47 running over wheels (sprocket wheels or rollers) 46 so that the chain or belt 47 runs parallel to the main chain. The chain or belt 47 carries lugs 48 which are spaced apart the same distance as the guide rollers 2' of the main chain and which engage these rollers, thereby moving the main chain in the desired direction.

In order to facilitate the even movement of the main chains, the same are equipped with springs 49, shown in FIGURE 23, which interconnect the links. The springs, which are of the hair-pin type, are pre-stressed and arranged about the connecting pins located at the joints 15. The springs coact with the joints 2 and 15 so as continuously to urge the links into a position wherein the chain is in its least extended positions.

Figure 24:
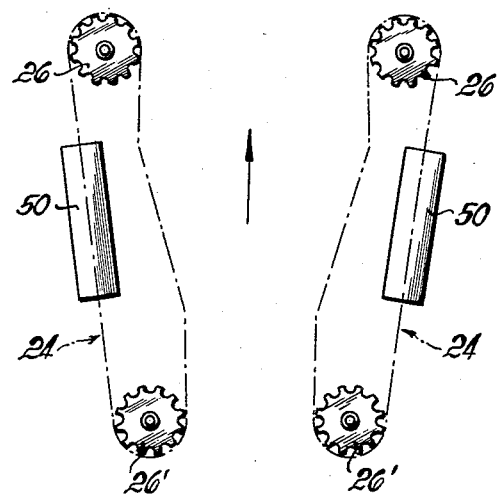
FIGURE 24 shows a drive arrangement for driving the chains.

In the embodiment of FIGURE 24, the chains 24 and wheels 26 and 26' are similar to the parts shown in FIGURE 13. The wheels 26', constituting the supply wheels are driven at a constant, adjustable speed. In order to adapt the speed of the take-up wheels 26 for longitudinal stretching in which the length of the taken-up chain 24 is greater than the length of the delivered chain, and also for changes in the degree of longitudinal stretching, the speed of the take-up wheels 26 is adjustable with respect to the speed of the delivery wheels. For expedience, separate drives are provided for the supply and take-up wheels.

According to a further feature of the present invention, the drive for the take-up wheels is so constructed that, independent of the speed, a constant, predetermined tension is applied on the chain. The drive for the wheels 26 can, for example, be a motor having an adjustable, infinitely variable transmission or a motor having a hyperbolic characteristic which exerts a constant preselected force irrespective of the speed. However, the drive may also occur via a slipping clutch coupling.

FIGURE 24 also shows cooling means 50 arranged in the return reach of each of the chains 24. Such cooling means can be used when the web is heated, as, for example, by hot liquids or vapors, during the stretching operation. This will also raise the temperature of the chucks holding the web to such an extent that they will still be hot by the time they return to the web pick-up point located in the region of the wheels 26'. As a result, the chucks could, were it not for the cooling means 50, produce undesired impressions in the web, or soften the web and cause it to tear.

Figure 25:
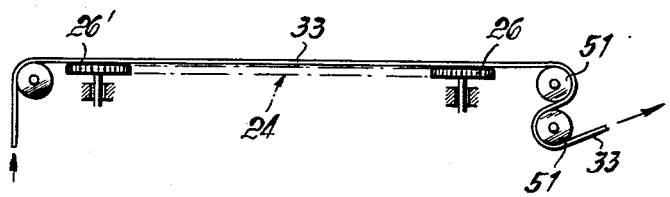
FIGURE 25 shows a device for removing the web from the stretching machine.

FIGURE 25 shows take-off rollers 51 by means of which the stretched web 33 is removed. The drive for these rollers 51 is preferably independent of the drive for the wheels 26, 26', and is such that the tension of the web between the rollers 51 and the delivery point of the chain, at wheels 26, is maintained constant. Thus, the drive for the rollers 51 may be of the same nature as the drives for the wheels 26, 26', e.g., an electric motor having a hyperbolic characteristic.

It will be understood that the above description of the present invention is susceptible to various modifications, changes, and adaptations, and the same are intended to be comprehended within the meaning and range of equivalents of the appended claims.

What is claimed is:

1. In a stretching machine, the combination which comprises:
   (a) a chain composed of pivotally interconnected links in zigzag arrangement which allows said links to be folded toward each other, said chain carrying means for holding the material to be stretched as well as two rows of engaging elements each of which rows extends in the direction of the length of said chain;
   (b) guide means including a plurality of rails forming two guide surfaces for limiting the stretching of said chain, each guide surface extending generally in the direction in which said chain is to travel, said guide surfaces forming an angle with each other, the engaging elements of one of said rows engaging only one of said surfaces and the engaging elements of the other of said rows engaging only the other of said surfaces; and
   (c) means for changing the angle between said guide surfaces.

2. The combination defined in claim 1 wherein at least some of said links have portions extending beyond the intersection with other links and wherein the engaging elements of one of said rows are carried by the extending portions.

3. The combination defined in claim 1 wherein at least one of said surfaces is, for a portion of its length, a curve of constant curvature.

4. The combination defined in claim 1 wherein said chains and guide means are arranged in a plane which forms an angle with the horizontal.

5. The combination defined in claim 1 wherein said guide means include two rails having surfaces constituting said two guide surfaces, respectively, said rails being made of a single piece of yieldable material, thereby allowing the angular orientation of individual sections of each of said rails to be adjusted.

6. The combination defined in claim 5, further comprising auxiliary moving means engaging said chain in a region where said links are bunched closely together.

7. The combination defined in claim 1, wherein said chain further comprises spring means associated with said links for urging said engaging elements into engagement with the respective guide surfaces.

8. A machine for stretching a web, comprising, in combination:
   (a) two chains arranged on opposite sides of said web, respectively, each chain being composed of pivotally interconnected links in zigzag arrangement which allows said links to be folded toward each other, each chain carrying means for holding the web as well as two rows of engaging elements each of which rows extends in the direction of the length of the respective chain;
   (b) two guide means associated with said two chains, respectively, each means forming two guide surfaces for limiting the stretching of the respective chain, each guide surface extending in the direction in which the respective chain is to travel, the engaging elements of one of said rows of the respective chain engaging only one of said two guide surfaces and the other of said rows of the respective chain engaging only the other of said two guide surfaces; and
   (c) means for changing the angle between at least one of said two guide means and the direction in which the web travels.

9. A machine as defined in claim 8, further comprising a pair of supply wheels, a pair of take-up wheels, and adjustable drive means connected to at least some of said wheels, each chain being passed over one respective supply wheel and one respective take-up wheel, said drive means exerting a constant force on said chains.

10. The combination defined in claim 1 wherein said guide means include two rails forming said two surfaces, respectively, each of said rails being divided into rail sections which are individually adjustable, and wherein means are provided for adjusting the angle between said rail sections, the facing ends of consecutive rail sections being connected by a yieldable bridge element.

References Cited in the file of this patent

UNITED STATES PATENTS

| | | |
|---|---|---|
| 2,728,941 | Alles et al. | Jan. 3, 1956 |
| 2,755,533 | Miller | July 24, 1956 |
| 2,923,966 | Tooke et al. | Feb. 9, 1960 |
| 3,014,234 | Koppehele | Dec. 26, 1961 |
| 3,046,599 | Nicholas et al. | July 31, 1962 |